Nov. 27, 1945.    J. W. C. CRAWFORD ET AL    2,389,958
RECOVERY OF POLYMERIC MATERIAL
Filed Feb. 2, 1942
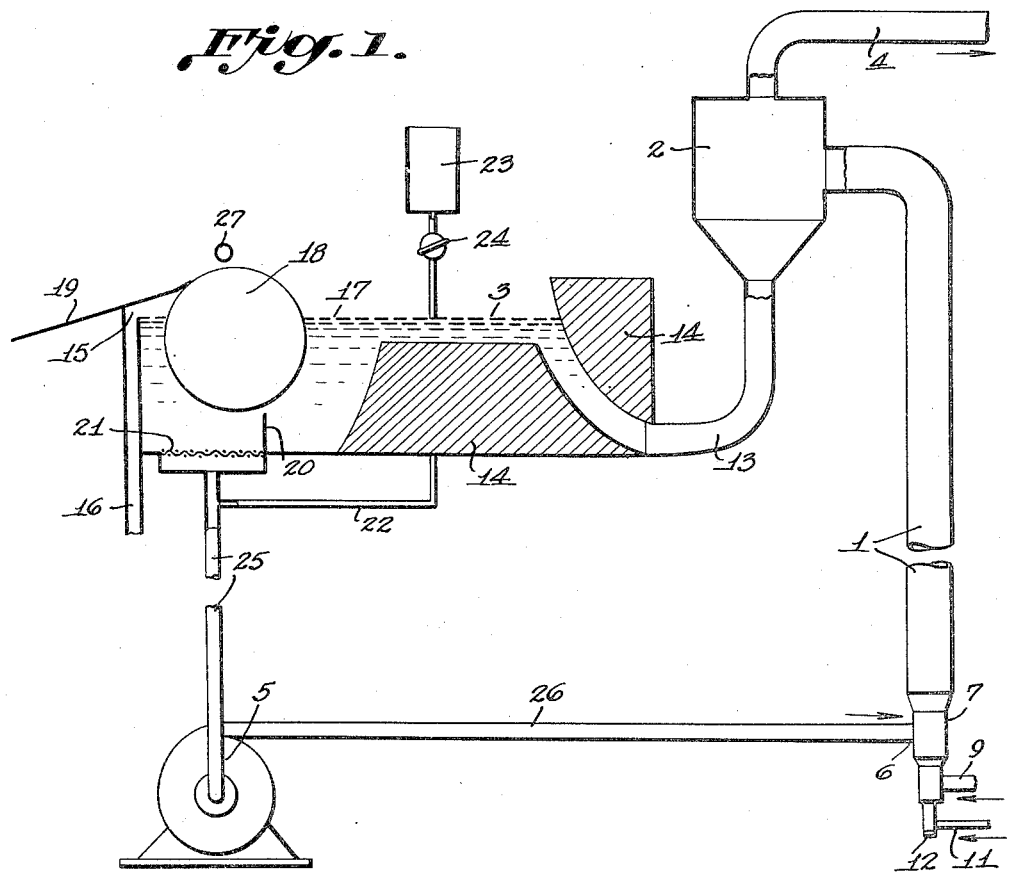
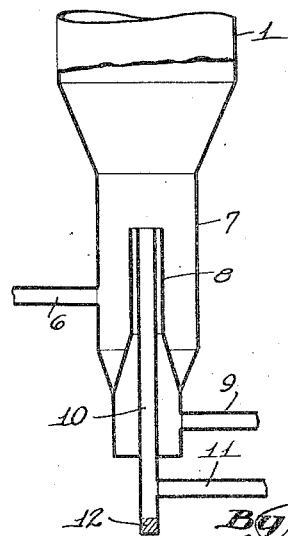
Inventors:
John William Croom Crawford
Arthur David Jones
By John L. Seymour
Attorney Patented Nov. 27, 1945

2,389,958

UNITED STATES PATENT OFFICE 2,389,958

RECOVERY OF POLYMERIC MATERIALS

John William Croom Crawford, Frodsham, via Warrington, and Arthur David Jones, Widnes, England, assignors to Imperial Chemical Industries Limited, a corporation of Great Britain Application February 2, 1942, Serial No. 429,333 In Great Britain February 28, 1941

14 Claims. (Cl. 260—88)

This invention relates to an improved method for the manufacture of chlorinated polymeric materials, and more particularly to the recovery of chlorinated polyvinyl chloride from its solutions in organic solvents.

It is customary to manufacture chlorinated polyvinyl chloride by chlorinating a solution of polymerised vinyl chloride, and it is already known to recover solid chlorinated polymerised vinyl chloride from solutions made in this way, for example, solutions in tetrachloroethane, by precipitation or coagulation with an alcohol, for instance, ethyl or methyl alcohol. This process, however, has serious disadvantages as it involves the handling of large quantities of mixed organic liquids which must be recovered separately if the process is to be worked economically.

Processes are also known in which materials, for example, chlorinated rubber, are recovered in solid form from solution in volatile organic solvents by injecting the solution into hot water or into an atmosphere of steam. If a process of this sort be applied to the recovery of chlorinated polyvinyl chloride from its solutions, the product obtained is soft and sticky and the particles adhere to the walls of the precipitation apparatus and to themselves, and it is obtained in the form of a coalesced mass of resin.

According to the present invention solid chlorinated polyvinyl chloride is recovered from its solution in a volatile organic solvent by a method of evaporating the solvent which comprises contacting the solution with steam in a hot aqueous medium containing a small amount of a water-soluble high molecular weight colloid. Advantageously, the product is withdrawn from contact with the aqueous medium as it is formed, and cooled forthwith as by spraying with cold water.

By this process the formation of a coalesced mass of resin is entirely prevented, and thus the disadvantages inherent in the earlier processes are avoided.

The amount of the colloid used in the process may be varied within wide limits, but for the attainment of the best results certain precautions have to be observed. With concentrations of the colloid in the water of the order of 1% to 2%, coalescing may be entirely prevented and also adhesion to the walls of the apparatus, but a product is then obtained which, while soluble in such solvents as tetrachloroethane and ethyl acetate, gives a turbid solution, and which may not be entirely suitable for such purposes as the production of moulded products. On the other hand, with concentrations of colloid in the water not exceeding 0.1%, e. g. 0.01 to 0.1%, adhesion of the particles to the walls of the apparatus can still be entirely prevented although some slight adhesion of the particles to each other may result giving a loosely matted product. Such a product is readily soluble in such solvents as tethachloroethane and ethyl acetate to give a practically clear solution, and it can be used satisfactorily in the manufacture of moulded products or for other purposes. The loose matting is very different from the coalescing which occurs in the absence of any colloid and offers no disadvantage, particularly if the product is chilled on removal from the aqueous medium, since a slight crushing or crumbling of the chilled product suffices to reduce it to a granular form. The loose matting may even be made use of in removing the material from the precipitation medium in a convenient continuous manner as will be more fully described hereinafter. Preferably we use in our invention water containing such amounts of colloid, i. e. 0.01 to 0.1%.

We have found that the best method for effecting the contact of the steam with the chlorinated polyvinyl chloride solution is to inject a stream of the latter into or in close proximity to a jet of steam which is simultaneously being introduced into the aqueous medium containing the water-soluble high molecular weight colloid. Using this procedure the solvent distils off leaving a product which rises to the surface of the aqueous medium in the form of granules or fine particles. According to the amount of colloid present, as indicated above, these particles will remain separate or may form a loosely compacted open layer or matting on the surface which after removal from the medium may be washed and dried and, in the case of the compacted layer, then broken by crushing or crumbling into granular form.

Suitable colloids for use in the present invention are, for example, starches, e. g. potato starch or rice starch, methyl starch, gum tragacanth, methyl cellulose and sodium alginate. The colloid may be added in solid form but it is preferred to add it in concentrated aqueous solution or suspension; for example, the gum tragacanth may be added as a dispersion or suspension in caustic soda solution. We have also found it advantageous to work at temperatures close to the boiling point of the aqueous medium, for example, at 98°–100° C., when the solvent distils off readily from the apparatus and may be condensed together with some steam. Suitable materials from which apparatus for operating the invention may be constructed are, for example, lead, glass, porcelain, earthenware and stainless steel.

The process may be carried out by a batch method, by injecting the steam and the solution in close proximity to each other into a tank of water containing the colloid, and when a sufficiency of product has accumulated in the upper layers the process may be interrupted and the product removed. Preferably, however, we carry out the process in a continuous manner, since thereby greater advantages over previous methods of precipitation accrue, and a readier control of the colloid feed can be made, with favourable results to the solubility characteristics of the product and to the operation of the apparatus.

One method of carrying out the invention continuously is to inject the solution of chlorinated polyvinyl chloride into a jet of steam at, e. g. 100–120° C., discharging into the lower part of a column of an aqueous solution of the colloid, which is maintained at an elevated temperature, for example, 96–99° C., and which is flowing up a pipe or channel. In this way the chlorinated polyvinyl chloride is precipitated and is carried away with the aqueous medium, while the organic solvent vapour passes away at the head of column together with steam, and may be recovered by condensation. Suitably, the aqueous effluent, together with the precipitated chlorinated polyvinyl chloride, passes into a reservoir in which the solid material collects on the surface of the water in the reservoir and is removed continuously or periodically and chilled by spraying with cold water or immersion in cold water, while the liquor is drawn off and returned, as by means of a pump, to the bottom of the precipitation pipe to be recirculated.

Some absorption of the colloid on the chlorinated polyvinyl chloride occurs, and as a result the aqueous solution is gradually depleted of its colloid content and continuous or periodic replenishment is needed. We have found it convenient to replenish the supply to the precipitating apparatus by periodic or continuous addition of small quantities of a concentrated aqueous suspension or solution of the colloid to the liquor which is recirculated in amounts up to about 2 parts for every 100 parts of product precipitated. In the preferred form of our invention in which a product is obtained giving a practically clear solution, we add the colloid in amounts between 0.15 to 0.25 part for every 100 parts of chlorinated polyvinyl chloride in the solution supplied to the process.

The velocity of circulation of the water in the tower may vary within fairly wide limits, being such that while the injected solution is rapidly removed from the region on which it is introduced, the time of passage up the tower is fully adequate for the vaporization of substantially all the solvent.

The precipitated material, after removal from the precipitation medium and chilling by immersion in water or spraying with water, is washed and dried, e. g. in vacuo and then when necessary broken up by a light crushing or crumbling. It is suitable for use in the manufacture of films, or as an ingredient of coating compositions.

Typical solutions of chlorinated polyvinyl chloride which may be treated according to our invention are solutions in chloroform, ethylene dichloride, tetrachloroethane, ethyl acetate or n-butyl acetate, which solutions may contain, e. g. 5% to 20% of chlorinated polyvinyl chloride containing 60% to 68% chlorine.

One method of carrying out our invention may be understood with reference to the accompanying diagrams which represent a suitable apparatus for this purpose in which Fig. 1 is a general diagrammatic view of the apparatus, the upper part being shown in section, and Fig. 2 is a diagram on a larger scale showing in section the lower part of the precipitating tower. Like numbers represent like parts in each figure.

Referring more particularly to Fig. 1, the apparatus comprises a wide precipitation pipe 1 communicating through a vapour separator 2 with a reservoir 3. By means of pipe 4 communicating with the top of separator 2 solvent vapour can be delivered to a condenser (not shown) while by means of pipes 25 and 26 and pump 5 water can be recirculated from reservoir 3 to the lower part of pipe 1.

As can best be seen in Fig. 2 the lower part of pipe 1 is of smaller diameter than the rest of the pipe, and in this narrower part is an inlet 6 communicating with the outlet side of pump 5 through pipe 26, and two concentric jets 8 and 10, reaching to approximately the same height above inlet 6, but not into the wider part of tube 1. The outer jet 8 can, by means of inlet 9, be put into communication with a source of steam, while the inner jet 10 can, by means of inlet 11, be put into communication with the supply of chlorinated polyvinyl chloride solution to be precipitated. Jet 10 has a removable plug 12 for cleaning purposes.

Referring again to Fig. 1, pipe 13 joins the lowest part of vapour separator 2 to the lower part of one end of reservoir 3 and by means of curved baffle-like blocks 14 within the reservoir a curved path is provided whereby liquid entering through pipe 13 is caused to flow to the upper part of the reservoir. At the remote end of the reservoir 3 is an overflow 15, connected to a waste pipe 16, which determines the level of the surface of the water in the reservoir shown at 17. A drum 18 is also provided at the same end of the reservoir which can be made to rotate by means not shown in an anticlockwise direction about a horizontal axis somewhat below the level 17 of the water. A chute 19 is provided to catch material carried out of the water by drum 18 and a spray pipe 27 enables water to be sprayed onto the material passing over the drum. A vertical baffle 20 reaching almost up to drum 18 checks solid material getting to overflow 15 and a screen 21 provides further protection against the inclusion of solid in the water drawn into pipe 25. By means of reservoir 23 and pipe 22 having a valve 24, and in communication with the upper part of pipe 25, a concentrated suspension or solution of high molecular weight colloid can be delivered to the water stream. The water in the reservoir may be heated by passing in steam by means not shown.

In using this apparatus, reservoir 3, pipe 1 and the communicating pipes 13, 25 and 26 are filled with water which is then heated by passing steam into the reservoir 3 and working the pump. High molecular weight colloid, e. g. soluble starch, is gradually supplied from vessel 23 until the water in circulation contains about 0.1% of the colloid. When the temperature at the head of precipitation pipe 1 reaches about 98° C. steam at, e. g. 100–120° C., is supplied to jet 8 by inlet 9, and then the solution of chlorinated polyvinyl chloride to be treated is introduced to jet 10 through inlet 9. Atomization and rapid heating of the solution occur immediately above the two jets, so the solvent is vaporized and the chlorinated polyvinyl chloride is precipitated in a disintegrated form; precipitated material and vapour in the form of bubbles are carried up pipe 1 with the hot water, and as a result of the presence of the colloid and of the formation of an envelope of vapour around the separate particles the latter do not coalesce or adhere to the walls of the apparatus. In separator 2, vapour separates and passes through pipe 4 to a condenser and is thus recovered, while water and suspended chlorinated polyvinyl chloride pass through pipe 13 to the reservoir 3. As a result of baffles 14, the suspension is delivered in a stream to the upper layers of the main body of water; this, together with the natural tendency of the product to float, ensures that the latter forms a layer on top of the water, which in view of the amount of colloid employed becomes loosely matted. The direction of the current of water causes this layer to be carried to drum 18 which picks it up and delivers it to chute 19, and while on the drum it is rapidly chilled by the spray of water from pipe 27. The water is for the most part returned by pump 5 to inlet 6, a small proportion being rejected at overflow 15. The process is thus conducted in a continuous manner.

Colloid will be slowly removed via outlet 16, through adsorption, and with water adhering to the product, but this loss can be made good by regulating the supply from vessel 23.

The following examples illustrate but do not limit the invention.

Example I

An apparatus was set up comprising an unpacked column through which an upward flow of heated water could be maintained. At the top of the column a separator was provided from which vapours passed to a condensing system, and the water carrying with it solid chlorinated polyvinyl chloride passed to a tank fitted with a baffle to restrain the solids. From the tank the water was returned through a pump to the base of the column to be recirculated. Live steam could be injected into the water in the tank by an injector. Near to the base of the column injectors were provided, one for introducing a continuous jet of steam and one for injecting a solution of chlorinated polyvinyl chloride in a thin stream directly into the steam jet. When the apparatus had been charged with water the steam was turned on to the injector in the reservoir, potato starch added as a concentrated suspension in amount equivalent to 0.1 per cent of the water in the apparatus and the pump was made to circulate the water at an approximate linear velocity of 1.0 ft./sec. up the column. When the temperature of the water had attained 99–100° C. the injector in the reservoir was turned off and that at the base of the column turned on and a 7 per cent solution of chlorinated polyvinyl chloride in tetrachloroethane was then injected. Solid chlorinated polyvinyl chloride rapidly separated from the solution and was carried up the column to collect in the tank. The solid was removed from the tank by perforated scoops, rapidly cooled in a tank of cold water and dried. Small periodic additions of potato starch were made to maintain the concentration of 0.1 per cent in the circulating liquor. The product did not adhere to the walls of the apparatus and was obtained in a granular form or as small friable pieces.

Example II

Using the apparatus and process of Example I but with gum tragacanth instead of potato starch, solid chlorinated polyvinyl chloride was again obtained in granular form.

Example III

Using the apparatus described in this specification with reference to the drawing, a potato starch solution containing 1.25 g. per litre of potato starch was introduced into the circulating body of water maintained at 99–100° C. at the rate of 0.4 part per hour (by volume) while a 97% (by weight) solution of chlorinated polyvinyl chloride solution was introduced at the rate of 3 parts per hour (by volume).

The solid particles of chlorinated polyvinyl chloride precipitated floated on the surface of the water in the tank and became loosely bound together to form a film which was lifted out of the water by the rotating drum. When cold, the film was readily broken up into granular material.

We claim:

1. In a process for recovering solid chlorinated polyvinyl chloride from solution in a volatile organic solvent, the step which comprises contacting the solution with steam in a hot aqueous medium containing a small amount of a water-soluble high molecular weight colloid.

2. A process according to claim 1 in which the hot aqueous medium contains between 0.01% and 0.1% of the colloid.

3. A process for recovering solid chlorinated polyvinyl chloride from solution in a volatile organic solvent which comprises contacting the solution with steam in a hot aqueous medium containing a small amount of water-soluble high molecular weight colloid to evaporate the solvent, removing the precipitated chlorinated polyvinyl chloride from the aqueous medium and chilling it forthwith.

4. In a process for recovering solid chlorinated polyvinyl chloride from solution in a volatile organic solvent, the step which comprises contacting the solution with steam in an aqueous medium maintained at a temperature near its boiling point containing a small amount of a water-soluble high molecular weight colloid.

5. In a process for recovering solid chlorinated polyvinyl chloride from solution in a volatile organic solvent, the step which comprises introducing a jet of steam into a hot aqueous medium containing a small amount of a water-soluble high molecular weight colloid, and simultaneously injecting into the hot aqueous medium in close proximity to the jet of steam, the solution of chlorinated polyvinyl chloride.

6. In a process for recovering solid chlorinated polyvinyl chloride from solution in a volatile organic solvent the step which comprises introducing a jet of stem into a hot aqueous medium containing a small amount of a water-soluble high molecular weight colloid maintained at a temperature near its boiling point, and simultaneously injecting into the hot aqueous medium in close proximity to the jet of steam, the solution of chlorinated polyvinyl chloride.

7. A process for recovering solid chlorinated polyvinyl chloride from solution in a volatile organic solvent which comprises introducing a jet of steam into a hot aqueous medium containing a small amount of a water-soluble high molecular weight colloid and simultaneously injecting the solution of chlorinated polyvinyl chloride into the hot aqueous medium in close proximity to the jet of steam so as to evaporate the solvent, removing the precipitated chlorinated polyvinyl chloride from the aqueous medium and chilling it forthwith.

8. A process for recovering solid chlorinated polyvinyl chloride from solution in a volatile organic solvent which comprises maintaining a body of hot aqueous medium containing a small amount of a water-soluble high molecular weight colloid, injecting steam into the lower part of the said body of hot aqueous medium, simultaneously injecting the solution of chlorinated polyvinyl chloride in close proximity to the jet of steam so as to evaporate the solvent, allowing the precipitated chlorinated polyvinyl chloride to rise to the surface of the hot aqueous medium, and recovering the said precipitated chlorinated polyvinyl chloride from the aqueous medium.

9. A process for recovering solid chlorinated polyvinyl chloride from solution in a volatile organic solvent which comprises setting up a circulating system of a hot aqueous medium containing a small amount of a water-soluble high molecular weight colloid, in part of which system the medium flows as an upwardly flowing stream, injecting steam into the lower part of the upwardly flowing stream, simultaneously injecting the solution of polyvinyl chloride in close proximity to the jet of steam so as to evaporate the solvent allowing the solvent vapours and the precipitated chlorinated polyvinyl chloride to travel to the upper part of the upwardly flowing stream, and subsequently removing the precipitated chlorinated polyvinyl chloride from the hot aqueous medium.

10. Process according to claim 9, followed by the step of chilling the chlorinated polyvinyl chloride forthwith.

11. A process for recovering solid chlorinated polyvinyl chloride from solution in a volatile organic solvent which comprises setting up a circulating system of a hot aqueous medium containing a small amount of a water-soluble high molecular weight colloid, in part of which system the medium flows as an upwardly flowing stream and passes thence through a vapour separator to a reservoir containing a body of the hot aqueous medium having a free surface, injecting steam into the lower part of the upwardly flowing stream, simultaneously injecting the solution of chlorinated polyvinyl chloride in close proximity to the jet of steam so as to evaporate the solvent, removing solvent vapour from the vapour separator, and removing precipitated chlorinated polyvinyl chloride from the free surface of the medium in the reservoir.

12. A process according to claim 11, in which the concentration of the colloid is maintained by supplying small amounts of the colloid to the medium delivered to the lower part of the upwardly flowing stream.

13. A process for recovering solid chlorinated polyvinyl chloride from solution in a volatile organic solvent which comprises setting up a circulating system of a hot aqueous medium containing a small amount of a water-soluble high molecular weight colloid, in part of which system the medium flows as an upwardly flowing stream and passes thence through a vapour separator to a reservoir containing a body of the hot aqueous medium having a free surface, continuously injecting steam into the lower part of the upwardly flowing stream, simultaneously injecting the solution of chlorinated polyvinyl chloride in close proximity to the jet of steam so as to evaporate the solvent, supplying amounts of water-soluble high molecular weight colloid to the medium delivered to the lower part of the upwardly flowing stream, said amounts corresponding to between 0.15 and 0.25 part for every 100 parts of chlorinated polyvinyl chloride in the solution injected into the medium, continuously removing solvent vapour from the vapour separator, allowing precipitated chlorinated polyvinyl chloride to form a loosely matted layer on the free surface of the body of the hot aqueous medium in the reservoir, and continuously withdrawing the loosely matted layer from the reservoir.

14. A process according to claim 13 in which the loosely matted layer withdrawn from the reservoir is chilled forthwith.

JOHN WILLIAM CROOM CRAWFORD.
ARTHUR DAVID JONES.